E. E. SWEET.
VALVE.
APPLICATION FILED SEPT. 25, 1908.
957,391.
Patented May 10, 1910.
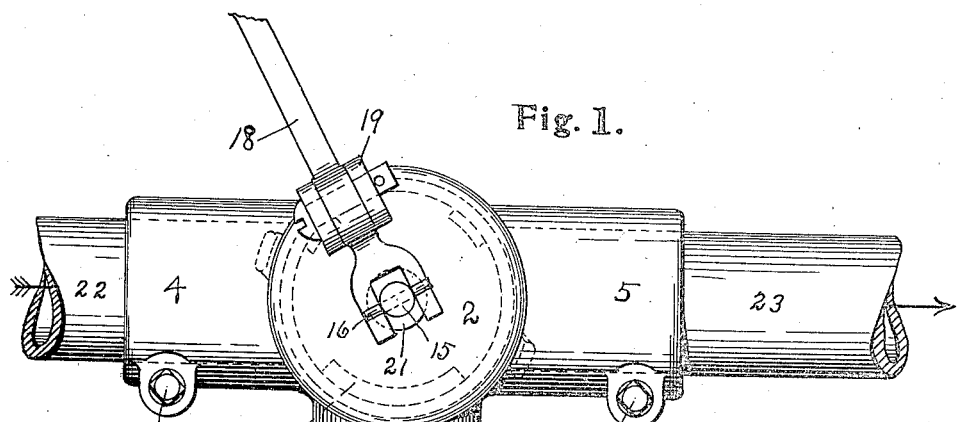
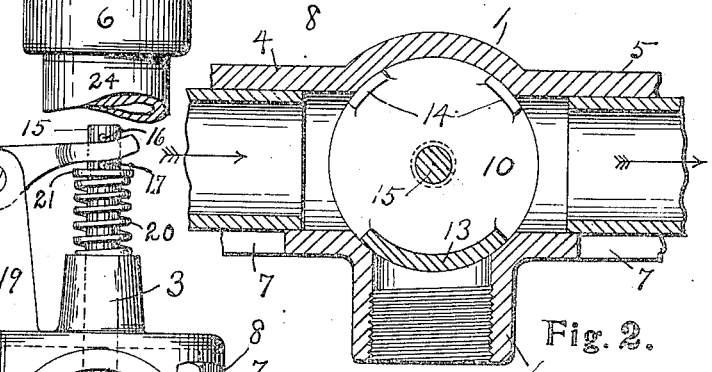
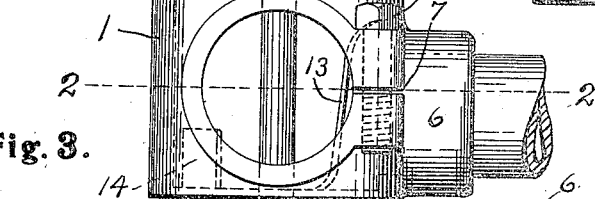
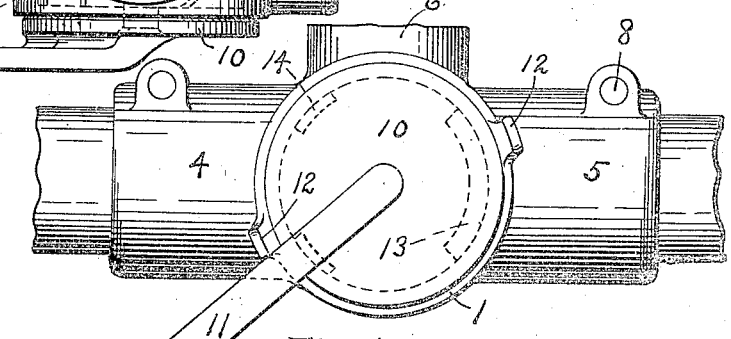

UNITED STATES PATENT OFFICE.

ERNEST E. SWEET, OF DETROIT, MICHIGAN, ASSIGNOR TO CADILLAC MOTOR CAR COMPANY, OF DETROIT, MICHIGAN, A CORPORATION OF MICHIGAN.

VALVE.

957,391.  Specification of Letters Patent.  Patented May 10, 1910.

Application filed September 25, 1908. Serial No. 454,722.

*To all whom it may concern:*

Be it known that I, ERNEST E. SWEET, a citizen of the United States, and a resident of Detroit, in the county of Wayne and State of Michigan, have invented a new and Improved Valve, of which the following is a specification.

My improvements relate to valves for controlling the exhaust of explosion engines, and the object of my invention is to provide a valve which shall not only control the course of the exhaust, as to direction, but shall also act as a relief valve in case of an explosion in the exhaust pipe.

My invention comprises a body portion or shell having openings, and a relief outlet, and a movable member which is spring held to close the relief outlet and which may be moved to close one or another of the other openings.

It further consists in combination with a valve as above described, of means for moving the valve from its seat to open the relief outlet.

In the accompanying drawing, Figure 1 is a view of one side of the valve. Fig. 2 is a cross section on the line 2—2 of Fig. 3. Fig. 3 is an end view and Fig. 4 is a view of the side of the valve opposite to that shown in Fig. 1.

Similar reference characters refer to like parts throughout the several views.

The valve consists of a body or shell, a movable member having a stem and an arm, a spring, and a lever. The body is composed of a cylindrical shell 1, closed at one end by the head 2, which head has a hub 3. Projecting from the shell are tubular connections 4, 5 and 6 which may be screw threaded to receive a pipe, or be smooth within so that the connecting pipes may be slipped longitudinally for adjustment. To hold the pipes in position the walls may be slotted as at 7 and screws 8 properly fitted to lock the parts.

Tightly fitting a seat at the edge of the opening at the end of the shell is a valve disk 10, having an arm 11 for turning the same. The movement of the arm is limited by the lugs 12 on the edge of the shell. To this disk 10 is united a gate 13 which may be moved to cover the opening in either of the connections 5 or 6. Upwardly extending guides 14 hold the disk central with respect to the bore of the shell, when off its seat.

Projecting through and slidable in the hub 3 is a stem 15 which is secured to the disk 10 and which carries two pins 16 and 17. Between these pins is the inner end of the lever 18 which is mounted between the arms 19 of a bracket that project from the head 2. A spring 20, between the washer 21 on the stem and the hub 3, normally holds the valve disk 10 onto its seat.

The operation of this construction is as follows, considering the pipe 22 as the exhaust pipe of the engine, the pipe 23 connecting to the muffler and the pipe 24 to the whistle. Should a gas explosion occur in the exhaust pipe the excessive pressure of the gas will force the disk 10 off its seat and let the gas escape. As the use of the muffler causes back pressure in the engine, it may be desirable at times to permit free exhaust, which may be accomplished by moving the disk 10 off its seat by means of the lever 18. Normally the exhaust will pass through the shell into the muffler, but in case it is desired to change the course as for instance to sound an alarm, the disk 10 may be turned by means of the handle or arm 11, swinging the gate 13 from across the opening in the connection 6 to across that in the connection 5. Where the exhaust gases are employed to heat the interior of an inclosed carriage, the radiator may connect to the pipe 24.

Having now explained my construction, what I claim as my invention and desire to secure by Letters Patent is:—

1. A valve comprising a cylindrical body having a head, and a plurality of connections for pipes and having the end opposite the head open, an outwardly movable disk to close said open end, a stem connected to said disk and projecting through said head, and a spring to normally hold the disk in position.

2. A valve comprising a shell, connections projecting therefrom, a head for said shell, a disk seated in an opening in the shell opposite the head and having a stem passing through the head, and a lever to move the disk off its seat.

3. A valve comprising a body portion having a series of apertures in one plane, and an aperture opening at right angles to said plane, a closure for the last named aperture, a gate to close another of said apertures secured to said closure, and a spring to normally hold the closure in position.

4. A valve comprising a case having an inlet passage and outlet passages, an outwardly movable closure for one of the outlet passages, and a gate mounted on the closure to close one or another of the other outlet passages.

5. A valve comprising a cylindrical body having three apertures in the sides and a head at one end, a disk for closing the opposite end, a spring to hold the disk in position, and a gate adapted to close one or another of the apertures according to the position of the disk.

6. A valve comprising a cylindrical body having apertures in the sides and pipe connections at said apertures, a head closing one end of said body and integral therewith, a disk closing the opposite end and mounted so it may have rotary and lateral movements, an arm on said disk to rotate the same, a gate on said disk adapted to close one or another of the apertures in the sides of the body according to the position to which the valve is turned, a stem on said disk extending through an opening in the head, a bracket on said head, a lever mounted on said bracket and in engagement with said stem whereby said disk may be moved laterally, and a spring on said stem to hold the disk against the end of the valve body.

In testimony whereof, I have signed this specification in the presence of two subscribing witnesses.

ERNEST E. SWEET.

Witnesses:
EDWARD N. PAGELSEN,
ELIZABETH M. BROWN.